Sept. 29, 1925.
M. L. REEP ET AL
FLUSH VALVE FOR TOILETS
Filed May 29, 1923
1,555,789
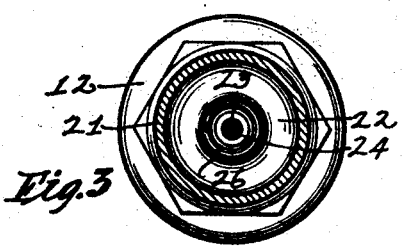
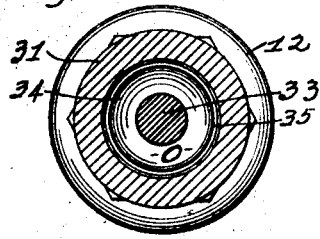
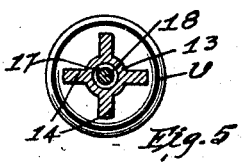
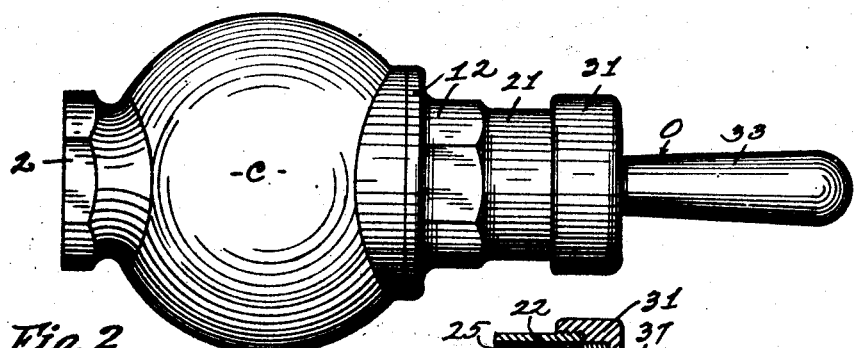
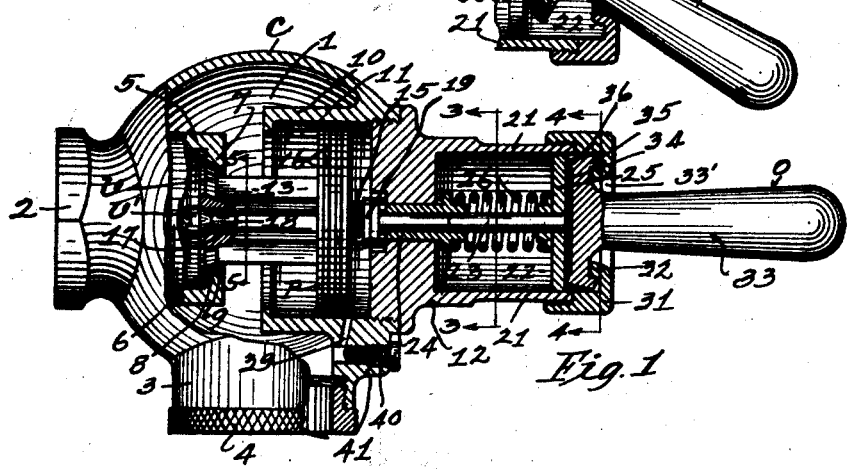
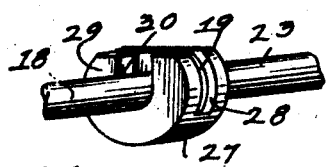
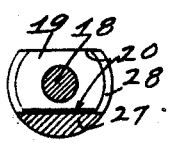
INVENTORS
FREDERIC J. WHITE &
MARTIN L. REEP
BY
ATTORNEYS.

Patented Sept. 29, 1925.

1,555,789

UNITED STATES PATENT OFFICE.

MARTIN L. REEP AND FREDERIC J. WHITE, OF LOS ANGELES, CALIFORNIA, ASSIGNORS TO SCHROEDER FLUSH VALVE COMPANY, OF LOS ANGELES, CALIFORNIA, A CORPORATION OF CALIFORNIA.

FLUSH VALVE FOR TOILETS.

Application filed May 29, 1923. Serial No. 642,157.

*To all whom it may concern:*

Be it known that we, MARTIN L. REEP and FREDERIC J. WHITE, citizens of the United States, and residents of Los Angeles, in the county of Los Angeles, State of California, have invented new and useful Improvements in Flush Valves for Toilets, of which the following is a specification.

This invention relates to flush valves for toilets and particularly to a form of flush valve as shown in the Letters Patent of the United States Number 1,112,564 to one H. G. Schroeder dated October 6, 1914, the invention, however, more particularly relates to operating means for valves of the character shown in the said patent, and the main object is to provide an improved means for operating valves of this character, embodying a reciprocable plunger spring held for normally holding the valve closed, and an oscillatable handle operatively connected with said plunger whereby the plunger may be depressed by the movement of the handle for opening the valve.

Another object is to provide an improved form of operating device, together with means for positively connecting the same with the valve, whereby the function of the operating member is not only to open the valve for flushing the toilet, but to provide connections whereby the restoration of the operating member to normal position would positively close the valve instead of relying upon the pressure in the water pipes, as heretofore employed.

Another object is to provide in a flush valve having a main valve and a pilot valve, a spring held plunger operatively connected therewith, and an operating member in the form of a lever universally pivoted in the casing and in engagement with the head of the plunger, whereby the movement of said operating member in any direction will effect initially, the opening of the pilot valve and subsequently the opening of the main valve, and the restoration of the operating member will effectively close both of said valves.

Other objects may appear as the description progresses.

We have illustrated one practical form of our invention in the accompanying drawings, in which:

Fig. 1 is a sectional elevation of our improved valve mechanism.

Fig. 2 is a top plan view of the same.

Fig. 3 is a transverse section on line 3—3 of Fig. 1.

Fig. 4 is a transverse section on line 4—4 of Fig. 1.

Fig. 5 is a transverse section on line 5—5 of Fig. 1.

Fig. 6 is a fragmentary section corresponding to Fig. 1, showing the operating mechanism in operated position.

Fig. 7 is a perspective view of a coupling employed for connecting the operating member with the valves.

Fig. 8 is a transverse section of said coupling.

As shown in the drawings our invention includes a casing C of spherical form, with a main chamber 1 therein, an inlet 2 is provided at one side and an outlet 3 is formed at right angles thereto. The inlet 2 is adapted for connection with a water service pipe (not shown) and the outlet 3 has a knurled coupling 4 threaded thereinto for connection with a pipe leading to a toilet.

We provide on the interior of the casing an annular extension 5 radially alined with the inlet 2 and having an inlet chamber 6 therein. The inner end 7 of the extension 5 has a valve seat 8 formed therein and a passage 9 affording communication between said valve seat and the chamber 1. Diametrically opposite the inlet extension 5 we provide a larger extension 10 with a cylinder 11 formed therein which is closed by means of a cap 12 threaded into the outer end of the cylinder.

Said cylinder has a piston P slidably mounted therein and a main valve V is attached to said piston by means of an elongated reduced portion 13 which as shown in Fig 5, has right angularly disposed ribs 14, 14, etc., of smaller diameter than the passage 9 in extension 5, while the valve V is disposed within the inlet chamber 6 and is adapted to seat in the valve seat 7 for closing communication between the chambers 6 and 1. The valve V is attached to the piston by means of a stem 15 which is threaded through and extends slidably beyond the opposite face of piston P.

Piston P has a plurality of rings 16, 16 for packing the same in the cylinder 11. Valve V has a central bore 17 which opens into the inlet chamber 6 and also into the rear chamber 11 on the far side of piston P, and a pilot valve V' is mounted on the main valve V for closing the inlet end of said bore, while a stem 18 extends entirely through said bore and is provided at the right hand end of chamber 11 with a head 19 which has one or more flat portions 20 formed thereon. The cap 12 has an elongated extension 21 with a cylinder 22 therein, and a plunger 23 is centrally and slidably mounted in said cap and is supported in a bushing 24 which is driven into the inner end of the cap.

Said plunger has a head 25 on the outer end thereof which fits the bore of the cylinder 22 and is adapted to slide therein, while a spring 26 is provided on the plunger 23 and is adapted to compress between the head 25 and the outer end of bushing 24, as shown in Fig 1. The inner end of plunger 23 has an enlarged head 27 thereon with a transverse slot 28 formed therein to receive and hold the head 19 on the valve stem 18, as shown in Fig. 7.

The innermost side 29 of head 27 is longitudinally slotted at 30 to receive the stem 18 so that the stems 18 and 23 are thus removably connected together, and the slot 28 in head 27 closely fits the head 19 of stem 18, so that the longitudinal movement of plunger 23 will effect a corresponding movement of the stem 18. The bottom of the slot 28 is flattened as shown in Fig. 8, to correspond to the flat 20 of the head 19 so that one of said members will be prevented from rotation with respect to the other.

The cylinder 22 of cap 12 is open at its outer end and is adapted to be closed by means of a collar 31 which is threaded onto the end of the extension 21. Said collar has an inturned annular portion 32 with a large opening 33' therein, and an operating member O is adapted to be held on the cap 12 between plunger 25 and collar 31, as shown in Fig. 1.

Operating member O has a handle 33 which extends substantially outwardly from the end of collar 31, and internally of said collar said operating member is provided with a circular portion 34 with annular portions 35 which encompass the portion 32 of the collar and an annular portion on the opposite side thereof which engages the outer surface of plunger 25.

Referring to Fig. 6, it will be noted that the periphery of the portion 34 of said operating member is beveled at 37 and 38 so that the handle 33 may be turned at a substantial angle within the collar 31, and cylinder 22 for depressing the head 25 and plunger 23.

The large opening 33' makes it possible to swing the handle 33 at a considerable angle to give considerable movement to the piston and valve, while the interchanging flanges 32 and 35 prevent the handle from swinging the member 34 to an angle great enough to cause said member to bind between the head 25 and collar 31 and thereby hold the valve open.

It will be understood of course, that the extent of movement of the handle 33 will control the extent of opening of the valve V and handle 33 may be turned in any direction, as it is universally mounted for operation on a cap 12. Spring 26 serves to hold the plunger 23 outwardly, and the tension thereof will restore handle 33 to the position shown in Fig. 1, when pressure thereon is released. A bleeding port 39 is provided in the wall of cylinder 11 as shown in Fig. 1, the area of which is regulated by means of an adjusting screw 40 threaded into a lug 41 on the casing.

Now, the operation of our valve is as follows: When the valve is properly connected with a water service system, pressure will be exerted against the valves V and V', which will tend to hold said valves closed, but it will be understood that this is not relied upon, for the coupling between valve stem 23 and valve stem 18 will effect the positive closing of the valves, by reason of the tension of spring 26 when the handle 33 of the operating member is in normal position. When said handle is initially moved, however to a slight angle, the pilot valve V' will have a slight differential movement with respect to valve V, and will open first. This allows an inrush of water from inlet chamber 6 through bore 17 to the rear side of piston P, and serves to bear the pressure against the piston, so that the further operation of the valve may be easily accomplished.

The further movement of the operating member O will open the valve V and allow water to flow through the valve seat 8 into the main chamber 1 of the valve, and thence outwardly through outlet 3 to the toilet. In a flushing operation the water will continue to flow as long as pressure is exerted on the operating member O in any direction, and when pressure thereon is released, the tension of spring 26 will serve to restore operating member O to normal position, and the coupling members 19 and 27 connecting stem 18 with plunger 23 will serve to move the valves V and V' inwardly to closed position, also the pressure in the water line will serve to expedite the closing of the valves immediately upon the release of the operating member.

Water having been initially admitted to the outer end of chamber 11 for balancing the pressure on the piston, when said piston is moved to the right as the valve closes, the water which remains in the chamber will be expelled through the bleeding port 39 into the chamber 1, so that the closing operation is thus quickly and positively effected when the operating member O is released.

The valve is so arranged that an ample quantity of water will flow therethrough for a flushing operation with but a momentary application of pressure to the operating member O.

We may modify or change the invention from the form shown within the scope of the appended claims without departing from the spirit or enlarging the scope thereof.

What we claim is:

1. In a device of the character described an operating mechanism including a reciprocable operated member, an oscillatable operating member, a spring holding said operated member in normal position, a fixed member having an inturned annular flange, said operating member having an enlarged inner portion provided with an annular flange telescoping the annular flange on said fixed member, the inner end of said operating member engaging said operated member and the periphery thereof being beveled so that when said operating member is oscillated said operated member will be reciprocated correspondingly.

2. In a device of the character described a cylinder, a plunger, reciprocably mounted therein, a spring for holding said plunger in normal position, a collar closing the end of said cylinder, having a central opening therein, and an annular flange surrounding said opening, an operating member having a handle extended through said opening, and an enlargement at its inner end loosely fitting said cylinder, said enlargement having a beveled annular flange telescoping the annular flange on said collar, and a beveled outer periphery permitting the oscillation of said operating member and said cylinder, the inner extremity of said enlargement frictionally engaging said plunger whereby when said operating member is oscillated said plunger will be reciprocated against the tension of said spring to a corresponding extent.

3. In a device of the character described a cylinder, a plunger reciprocably mounted therein, a spring for holding said plunger in normal position, a collar closing the end of said cylinder, said collar having a large opening therein, an annular flange on said collar surrounding said opening, an operating member having a handle extending through said opening, an enlargement at the inner end of said handle fitting loosely in said cylinder, said enlargement having an annular flange telescoping the annular flange on said collar, the inner extremity of said enlargement frictionally engaging said plunger whereby when said operating member is oscillated said plunger will be reciprocated against the tension of said spring to a corresponding extent.

MARTIN L. REEP.
FREDERIC J. WHITE.